United States Patent
Yang et al.

(10) Patent No.: US 11,456,960 B2
(45) Date of Patent: Sep. 27, 2022

(54) METHOD OF NETWORK DATA TRANSMISSION AND METHOD OF NETWORK DATA RECEPTION

(71) Applicant: Jotun Technology Inc., Hsinchu (TW)

(72) Inventors: Shun-Yuan Yang, Hsinchu (TW); Ming-Hsun Wu, Hsinchu (TW); Wei-Teng Tai, Hsinchu (TW)

(73) Assignee: JOTUN TECHNOLOGY INC., Hsinchu (TW)

( * ) Notice: Subject to any disclaimer, the term of this patent is extended or adjusted under 35 U.S.C. 154(b) by 0 days.

(21) Appl. No.: 17/145,036

(22) Filed: Jan. 8, 2021

(65) Prior Publication Data

US 2021/0218685 A1 Jul. 15, 2021

(30) Foreign Application Priority Data

Jan. 15, 2020 (TW) ................ 109101311

(51) Int. Cl.
*H04L 47/2483* (2022.01)
*H04L 47/80* (2022.01)
*H04L 47/283* (2022.01)

(52) U.S. Cl.
CPC ........ *H04L 47/2483* (2013.01); *H04L 47/283* (2013.01); *H04L 47/805* (2013.01)

(58) Field of Classification Search
CPC .. H04L 47/2483; H04L 47/283; H04L 47/805
See application file for complete search history.

(56) References Cited

U.S. PATENT DOCUMENTS

| 2012/0033590 A1 | 2/2012 | Jazra et al. | |
| 2012/0236772 A1* | 9/2012 | Kondratiev | H04L 47/56 370/345 |
| 2013/0044599 A1* | 2/2013 | Cherian | H04W 28/0205 370/235 |

(Continued)

FOREIGN PATENT DOCUMENTS

CN 101399716 A 4/2009

OTHER PUBLICATIONS

Search Report appended to an Office Action, which was issued to Taiwanese counterpart application No. 109101311 by the TIPO dated Jun. 30, 2020, with an English translation thereof (2 pages).

*Primary Examiner* — Chi H Pham
*Assistant Examiner* — Weibin Huang
(74) *Attorney, Agent, or Firm* — Hamre, Schumann, Mueller & Larson, P.C.

(57) ABSTRACT

A method of network data transmission is implemented by a computer device, and includes: defining every data packet to be generated by a specific application program as belonging to a direct data packet; defining every data packet to be generated by other application programs as belonging to a controlled data packet; determining which one of the direct data packet and the controlled data packet a data packet belongs to; and when it is determined that the data packet belongs to the direct data packet, transmitting the data packet, and delaying transmission of another data packet which is determined as belonging to the controlled data packet and which is received later than the data packet that is determined as belonging to the direct data packet.

6 Claims, 4 Drawing Sheets

(56) References Cited

U.S. PATENT DOCUMENTS

| | | | | |
|---|---|---|---|---|
| 2013/0311643 A1* | 11/2013 | Kulkarni | ............ | H04L 43/0852 |
| | | | | 709/224 |
| 2014/0241164 A1* | 8/2014 | Cociglio | ............ | H04L 47/2475 |
| | | | | 370/235 |
| 2014/0301373 A1* | 10/2014 | Cili | ........................ | H04L 67/62 |
| | | | | 370/336 |
| 2017/0150391 A1* | 5/2017 | Bergquist | .......... | H04W 72/1205 |
| 2017/0215022 A1* | 7/2017 | Chang | .................... | H04W 4/50 |
| 2020/0336263 A1* | 10/2020 | Halepovic | ............ | H04W 72/08 |

* cited by examiner

METHOD OF NETWORK DATA TRANSMISSION AND METHOD OF NETWORK DATA RECEPTION

CROSS-REFERENCE TO RELATED APPLICATION

This application claims priority of Taiwanese Invention Patent Application No. 109101311, filed on Jan. 15, 2020.

FIELD

The disclosure relates to a method of network data transmission and a method of network data reception.

BACKGROUND

For delay-sensitive applications (e.g., multimedia entertainment applications or online games), high latency, which may be caused by poor quality of service (QoS) and limited network bandwidth, may bring about an unpleasant experience for users. In order to alleviate such an issue, a conventional method of network data transmission and reception assigns priorities to data packets based on packet characteristics (e.g., a service type, a protocol type and/or packet contents) of the data packets, and ensures a data packet having a high priority is transmitted and/or received prior to another data packet having a low priority. In this way, latency for data packets that have high priorities may be reduced.

However, for data packets generated and/or received by a specific application program that is currently being used by a user, not all of the data packets have identical packet characteristics, and hence not all priorities of the data packets are the same. Consequently, inconsistency in latencies for the data packets regarding the specific application program may occur, adversely affecting user experience of the specific application program.

SUMMARY

Therefore, an object of the disclosure is to provide a method of network data transmission and a method of network data reception that can alleviate at least the drawback of the prior art.

According to one aspect of the disclosure, the method of network data transmission is to be implemented by a computer device. The computer device executes a packet management program and a plurality of application programs. The computer device is electrically connected to a communication device that is in connection with a communication network. The method includes steps of:
  A) defining every data packet that is to be generated by a specific one of the application programs as belonging to a direct data packet;
  B) defining every data packet that is to be generated by the others of the application programs as belonging to a controlled data packet;
  C) determining which one of the direct data packet and the controlled data packet a data packet that is generated by one of the application programs and that is received via the packet management program belongs to; and
  D) when it is determined that the data packet belongs to the direct data packet, transmitting the data packet to the communication device for further transmission via the communication network, and delaying transmission of another data packet which is determined as belonging to the controlled data packet and which is received later than the data packet that is determined as belonging to the direct data packet in step C).

According to another aspect of the disclosure, the method of network data reception is to be implemented by the computer device that is previously described. The method includes steps of:
  a) defining every data packet that is to be received by a specific one of the application programs as belonging to a direct data packet;
  b) defining every data packet that is to be received by the others of the application programs as belonging to a controlled data packet;
  c) determining which one of the direct data packet and the controlled data packet a data packet that is received via the packet management program through the communication device from the communication network belongs to; and
  d) when it is determined that the data packet belongs to the direct data packet, passing the data packet to the specific one of the application programs, and delaying passage of another data packet which is determined as belonging to the controlled data packet and which is received later than the data packet that is determined as belonging to the direct data packet in step c).

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
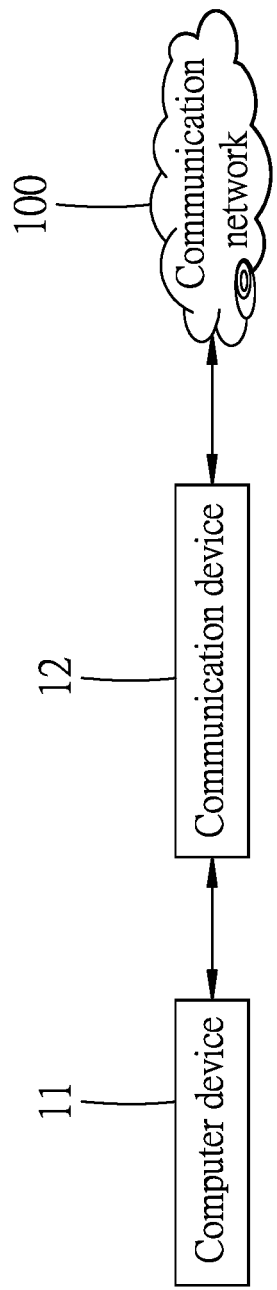
FIG. 1 is a block diagram illustrating an embodiment of a computer device that is utilized to implement a method of network data transmission and a method of network data reception according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a computer device 11 utilized to implement a method of network data transmission and a method of network data reception according to the disclosure is illustrated. The computer device 11 is electrically connected to a communication device 12 that is in connection with a communication network 100. The communication device 12 transfers data packets between the computer device 11 and another computer device (not shown) via the communication network 100.

The computer device 11 executes a packet management program and a plurality of application programs. Each of the application programs is assigned with a priority. In this embodiment, each of the priorities assigned to the application programs is categorized as one of a high priority level, a medium priority level and a low priority level.

It should be noted that for the method of network data transmission, a data packet generated by one of the application programs has to be provided to the packet management program in advance so as to be further transmitted to the communication network 100. For the method of network data reception, a data packet is passed by the packet management program to one of the application programs after being received from the communication network 100.

In this embodiment, the computer device 11 may be implemented to be a desktop computer, a laptop computer, a notebook computer, a tablet computer or a smartphone, but implementation thereof is not limited to what are disclosed herein and may vary in other embodiments.

In this embodiment, the communication device 12 is implemented to be a network interface controller or a wireless transceiver that supports wired communication standards and/or wireless communication standards, such as Bluetooth technology standards or cellular network technology standards, but is not limited thereto.

The method of network data transmission and the method of network data reception are similar, and can be implemented together on the same computer device 1 in practice.

Figure 2:
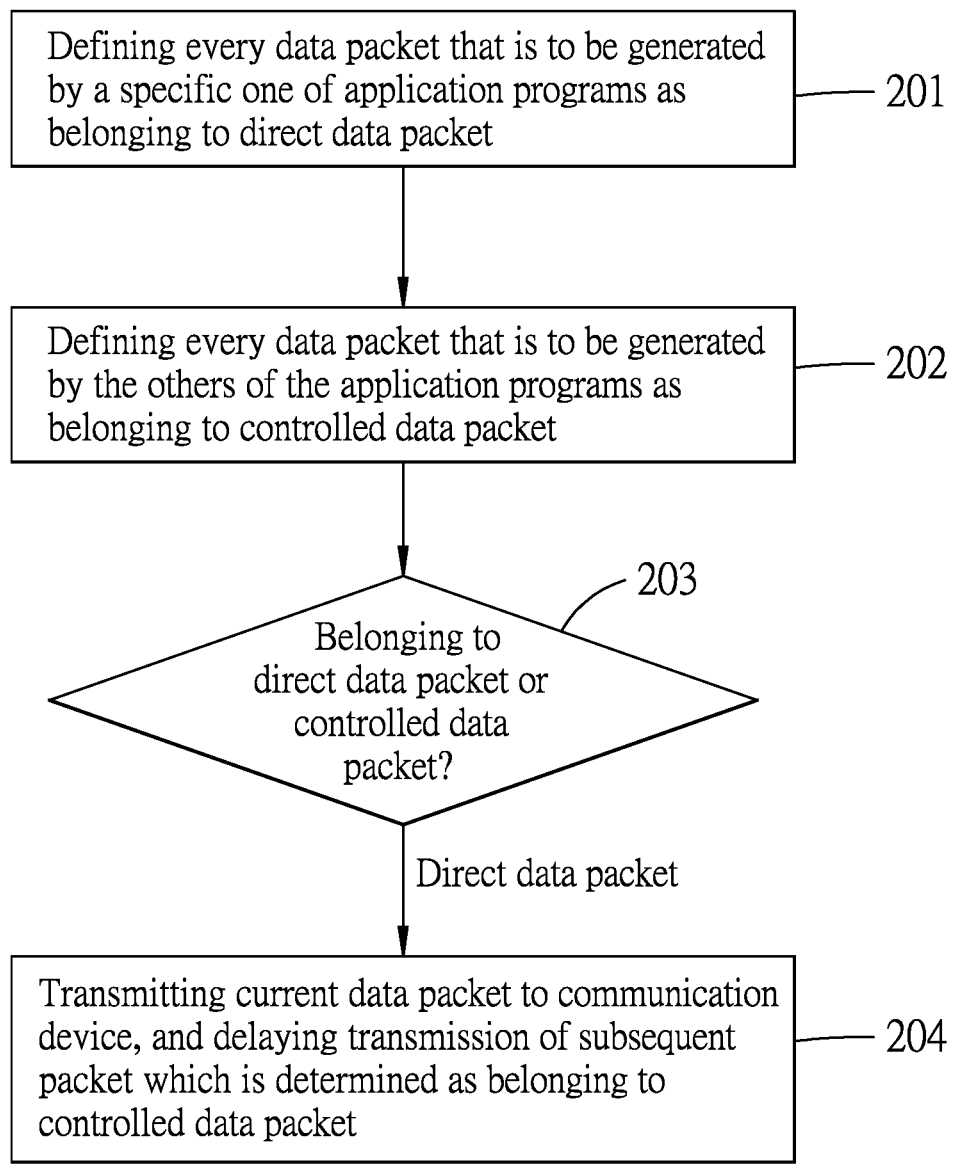
FIG. 2 is a flow chart illustrating an embodiment of the method of network data transmission.

Referring to FIGS. 1 and 2, an embodiment of the method of network data transmission includes steps 201 to 204 delineated below.

In step 201, the computer device 11 defines every data packet that is to be generated by a specific one of the application programs as belonging to a direct data packet. In this embodiment, the specific one of the application programs is one of the application programs that is presented in the foreground window (i.e., the window with which a user is currently working). For example, the specific one of the application programs may be an online game that is being played by the user. In one embodiment, a handle of the foreground window is retrievable in the Microsoft Windows operating systems by calling Windows application programming interface (API) functions such as "GetWindow" or "GetForegroundWindow" to facilitate determination of the application program presented in the foreground window. It should be noted that in other embodiments, determination as to which one of the application programs serves as the specific one of the application programs may be made by the user, or by the computer device 11 based on the settings of the computer device 11.

It should be noted that defining a data packet to be generated by an application program can be realized by creating an entry of correspondence relationship between the definition (e.g., belonging to the direct data packet) of the data packet to be generated and program information (e.g., a file name, a product name or a company name) related to the application program in a look-up table.

In one embodiment, every data packet to be generated by an application program (e.g., an online game) which is not presented in the foreground window and which is desired by the user to be run with highest priority may be defined as belonging to the direct data packet. In other words, the source of the direct data packet may be plural in number.

In step 202, the computer device 11 defines every data packet that is to be generated by the others of the application programs as belonging to a controlled data packet.

In step 203, the computer device 11 determines which one of the direct data packet and the controlled data packet a data packet that is generated by one of the application programs and that is received via the packet management program belongs to. When it is determined that the data packet belongs to the direct data packet, a procedure flow of the method proceeds to step 204.

It should be noted that determining which type (i.e., the direct data packet or the controlled data packet) a data packet generated by an application program belongs to can be realized by looking up the definition of the data packet in the look-up table with the program information related to the application program as reference input.

In step 204, the computer device 11 transmits the data packet which is determined as belonging to the direct data packet to the communication device 12 for further transmission via the communication network 100. In addition, the computer device 11 delays transmission of another data packet which is determined as belonging to the controlled data packet and which is received later than the data packet that is determined as belonging to the direct data packet in step 203.

Specifically speaking, when it is determined in step 203 that the data packet belongs to the direct data packet, in step 204, the computer device 11 immediately transmits the data packet to the communication device 12, assigns a first logical value (e.g., a logical value "1") to a delay flag, maintains the delay flag at the first logical value for a predetermined duration (e.g., 1 millisecond), and refrains from transmitting the another data packet that is determined as belonging to the controlled data packet during a period when the logical value of the delay flag is maintained at the first logical value. When the predetermined duration for which the delay flag is maintained at the first logical value has elapsed, and when no other data packet that belongs to the direct data packet is received via the packet management program, the computer device 11 assigns, via the packet management program, a second logical value (e.g., a logical value "0") that is different from the first logical value to the delay flag, and directly transmits, via the packet management program, the another data packet that is determined as belonging to the controlled data packet to the communication device 12. More specifically, when the delay flag is at the second logical value, the computer device 11 transmits, via the packet management program, the another data packet to the communication device 12 based on the priority with which the application program that generated the another data packet is assigned. That is to say, for data packets that belong to the controlled data packet, a data packet generated by an application program that is assigned with the high priority level would be transmitted prior to another data packet generated by another application program that is assigned with the medium priority level or the low priority level, and a data packet generated by an application program that is assigned with the medium priority level would be transmitted prior to another data packet generated by another application program that is assigned with the low priority level.

In brief, when it is determined that a data packet belongs to the controlled data packet, whether or not to transmit this data packet depends on which one of the first logical value and the second logical value the delay flag is at. The data packet which is determined as belonging to the controlled data packet is transmitted when the delay flag is at the second logical value. When multiple data packets belonging to the controlled data packet are to be transmitted, the data packets are sequentially transmitted in an order of the priorities with which the application programs that generated the data packets are assigned.

Figure 5:
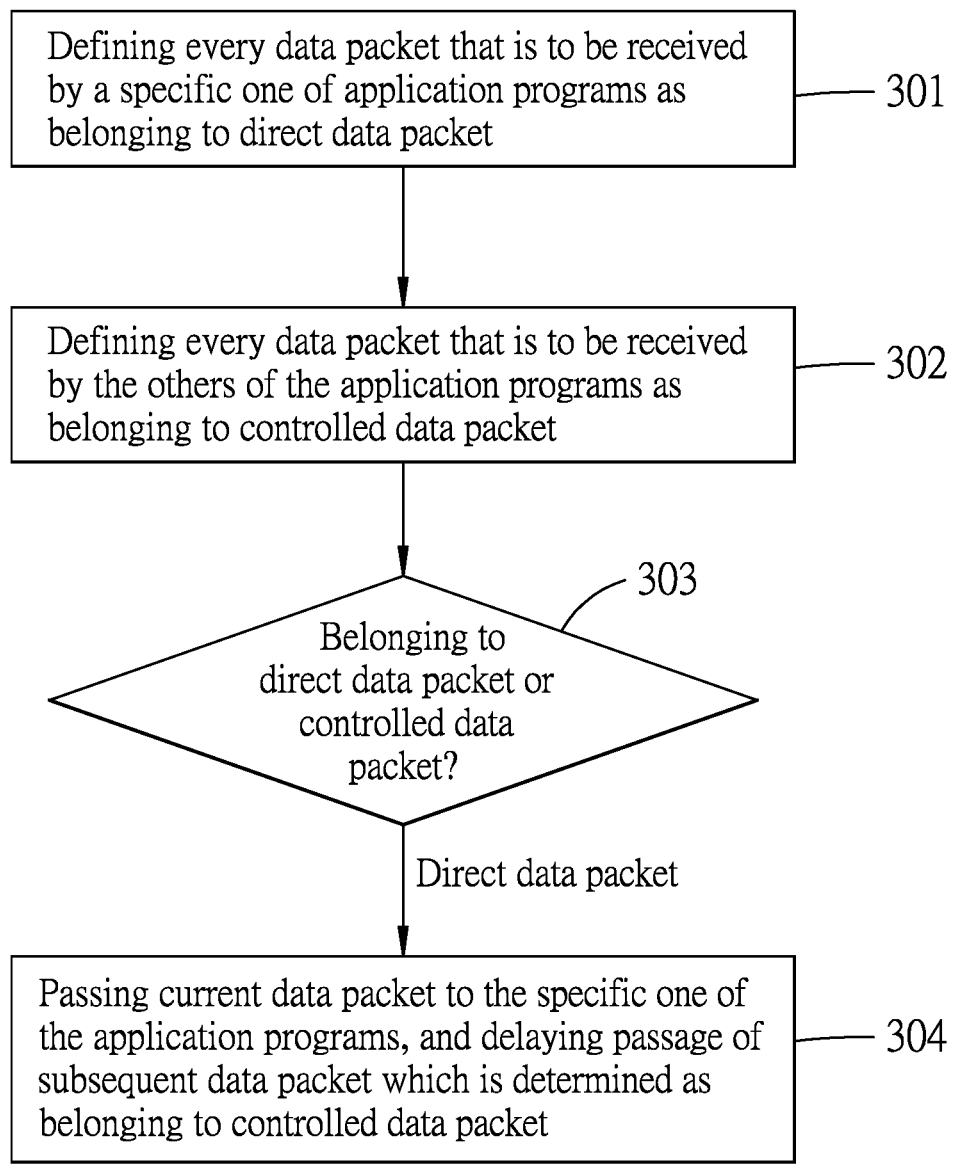
FIG. 5 is a flow chart illustrating an embodiment of the method of network data reception.

Referring to FIGS. 1 and 5, an embodiment of the method of network data reception includes steps 301 to 304 delineated below.

In step 301, the computer device 11 defines every data packet that is to be received by a specific one of the application programs as belonging to the direct data packet. Similar to the embodiment of the method of network data transmission, the specific one of the application programs is one of the application programs that is presented in the foreground window.

In step 302, the computer device 11 defines every data packet that is to be received by the others of the application programs as belonging to the controlled data packet.

In step 303, the computer device 11 determines which one of the direct data packet and the controlled data packet a data packet that is received via the packet management program through the communication device 12 from the communication network 100 belongs to. When it is determined that the data packet belongs to the direct data packet, the procedure flow of the method proceeds to step 304.

In step 304, the computer device 11 passes the data packet to the specific one of the application programs. In addition, the computer device 11 delays passage of another data packet which is determined as belonging to the controlled data packet and which is received later than the data packet that is determined as belonging to the direct data packet in step 303.

Specifically speaking, when it is determined in step 303 that the data packet belongs to the direct data packet, the computer device 11 immediately passes the data packet to the specific one of the application programs, assigns a first logical value (e.g., a logical value "1") to a delay flag, maintains the delay flag at the first logical value for a predetermined duration (e.g., 1 millisecond), and refrains from passing the another data packet that is determined as belonging to the controlled data packet during a period when the logical value of the delay flag is maintained at the first logical value. When the predetermined duration for which the delay flag is maintained at the first logical value has elapsed, and when no other data packet that belongs to the direct data packet is received via the packet management program, the computer device 11 assigns, via the packet management program, a second logical value (e.g., a logical value "0") that is different from the first logical value to the delay flag, and directly passes, via the packet management program, the another data packet that is determined as belonging to the controlled data packet to one of the others of the application programs. More specifically, when the delay flag is at the second logical value, the computer device 11 passes, via the packet management program, the another data packet to said one of the others of the application programs based on the priority with which the application program that is to receive the another data packet is assigned. Since the procedure of the method of network data reception is similar to that of the method of network data transmission, detailed explanation thereof is omitted herein for the sake of brevity.

Figure 3:
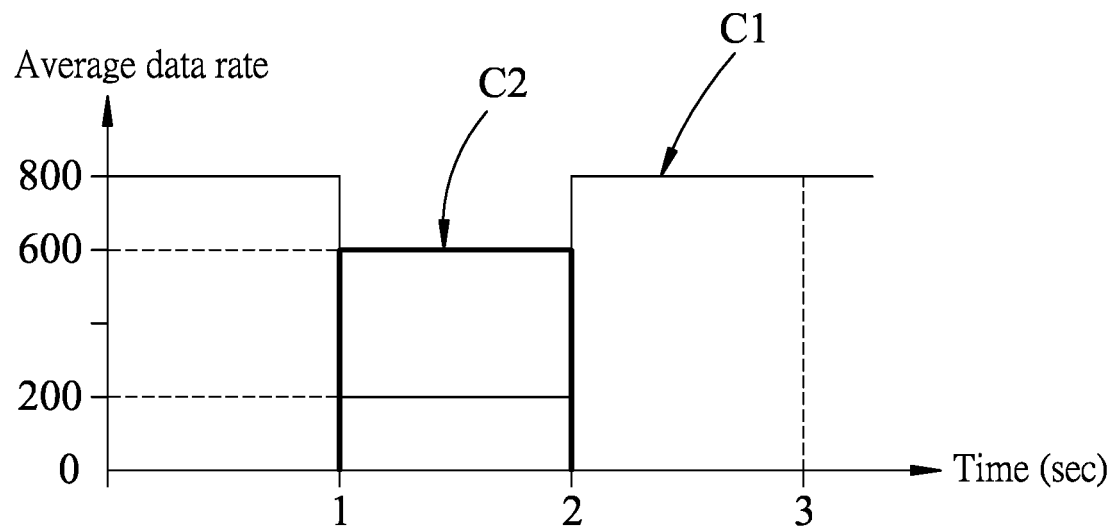
FIG. 3 is a schematic diagram exemplarily illustrating an embodiment of average data rate of throughput of the computer device.

Referring to FIG. 3, an average data rate of packet transmission by the computer device 11 is exemplarily illustrated and is expressed in megabits per second (Mbps) for explaining the embodiment of the method of network data transmission according to the disclosure. In this example, the packet management program of the computer device 11 continuously receives data packets that belong to the controlled data packet and that are generated by the application program which is assigned with the high priority level, and further receives data packets that belong to the direct data packet only in a time interval between the first second and the second second. As shown in FIG. 3, not influenced by the data packets that belong to the direct data packet, the average data rate at which the computer device 11 transmits the data packets that belong to the controlled data packet in time intervals from zero second to first second and from second second to third second (indicated by a thin line (C1)) is 800 Mbps. Comparatively, the average data rate at which the computer device 11 transmits the data packets that belong to the direct data packet in the time interval from first second to second second (indicated by a thick line (C2)) is 600 Mbps. Since transmission of the data packets that belong to the direct data packet occupies bandwidth of the computer device 11, the average data rate at which the computer device 11 transmits the data packets that belong to the controlled data packet is reduced to 200 Mbps.

Figure 4:
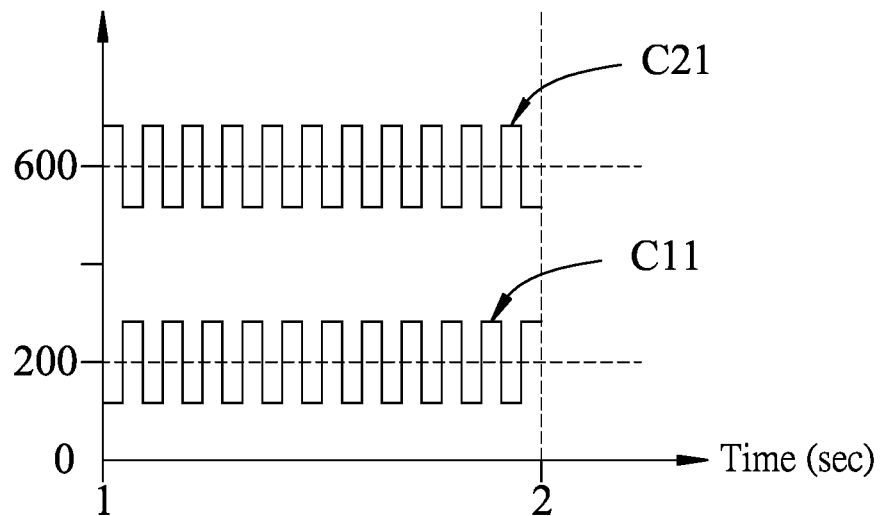
FIG. 4 is a schematic diagram exemplarily illustrating an embodiment of instantaneous data rate of throughput of the computer device in a period when transmission of controlled data packets are influenced by direct data packets.

Referring to FIG. 4, instantaneous data rates of packet transmission by the computer device 11 for transmitting data packets that belong to the direct data packet and data packets that belong to the controlled data packet in the time interval between the first second and the second second are exemplarily and respectively illustrated by lines (C21 and C11) each having the shape of a pulse wave, and have average values of 600 Mbps and 200 Mbps, respectively. The instantaneous data rates are expressed in megabits per second (Mbps). It should be noted that the lines (C1, C2, C21 and C11) in FIGS. 3 and 4 are illustrated for exemplary purposes, and the scale of variations of throughput of the computer device 11 may be different from actual situations.

To sum up, in the method of network data transmission according to the disclosure, every data packet generated by one of the application programs is categorized as one of the direct data packet and the controlled data packet. A data packet that belongs to the direct data packet would be immediately transferred, while for following data packet which is received subsequent to the direct data packet and which belongs to the controlled data packet, transmission of the following data packet would be delayed so as to reserve valuable transmission bandwidth for the direct data packet. That is to say, a data packet categorized as the direct data packet has a relatively higher priority than another data packet categorized as the controlled data packet. In this way, latencies for data packets related to a specific application program with which a user is currently working may be reduced, and hence user experience of the specific application program may be improved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method of network data transmission, to be implemented by a computer device, the computer device executing a packet management program and a plurality of application programs, the computer device being electrically connected to a communication device that is in connection with a communication network, the method comprising:
   A) defining every data packet that is to be generated by a specific one of the application programs as belonging to a direct data packet;
   B) defining every data packet that is to be generated by the others of the application programs as belonging to a controlled data packet; and
   C) determining which one of the direct data packet and the controlled data packet a data packet that is generated by one of the application programs and that is received via the packet management program belongs to; and
   D) when it is determined that the data packet belongs to the direct data packet, transmitting the data packet to the communication device for further transmission via the communication network, and delaying transmission of another data packet which is determined as belonging to the controlled data packet and which is received later than the data packet that is determined as belonging to the direct data packet in step C),
   wherein step D) includes:
      when it is determined in step C) that the data packet belongs to the direct data packet, immediately transmitting the data packet to the communication device, assigning a first logical value to a delay flag, maintaining the delay flag at the first logical value for a predetermined duration, and refraining from transmitting the another data packet that is determined as belonging to the controlled data packet during a period when the logical value of the delay flag is maintained at the first logical value; and
      when the predetermined duration for which the delay flag is maintained at the first logical value has elapsed, and when no other data packet that belongs to the direct data packet is received via the packet management program, assigning, via the packet management program, a second logical value that is different from the first logical value to the delay flag, and directly transmitting, via the packet management program, the another data packet that is determined as belonging to the controlled data packet to the communication device.

2. The method as claimed in claim 1, wherein:
   each of the application programs is assigned with a priority; and
   step D) further includes, when the delay flag is at the second logical value, transmitting, via the packet management program, the another data packet to the communication device based on the priority with which the application program that generated the another data packet is assigned.

3. The method as claimed in claim 1, wherein the specific one of the application programs corresponds to one of the application programs that is presented in the foreground window.

4. A method of network data reception, to be implemented by a computer device, the computer device executing a packet management program and a plurality of application programs, the computer device being electrically connected to a communication device that is in connection with a communication network, the method comprising:
   a) defining every data packet that is to be received by a specific one of the application programs as belonging to a direct data packet;
   b) defining every data packet that is to be received by the others of the application programs as belonging to a controlled data packet;
   c) determining which one of the direct data packet and the controlled data packet a data packet that is received via the packet management program through the communication device from the communication network belongs to; and
   d) when it is determined that the data packet belongs to the direct data packet, passing the data packet to the specific one of the application programs, and delaying passage of another data packet which is determined as belonging to the controlled data packet and which is received later than the data packet that is determined as belonging to the direct data packet in step c),
   wherein step d) includes:
      when it is determined that the data packet belongs to the direct data packet, immediately passing the data packet to the specific one of the application programs, assigning a first logical value to a delay flag, maintaining the delay flag at the first logical value for a predetermined duration, and refraining from passing the another data packet that is determined as belonging to the controlled data packet during a period when the logical value of the delay flag is maintained at the first logical value; and
      when the predetermined duration for which the delay flag is maintained at the first logical value has elapsed, and when no other data packet that belongs to the direct data packet is received via the packet management program, assigning, via the packet management program, a second logical value that is different from the first logical value to the delay flag, and directly passing, via the packet management program, the another data packet that is determined as belonging to the controlled data packet to one of the others of the application programs.

5. The method as claimed in claim 4, wherein:
   each of the application programs is assigned with a priority; and
   step d) further includes, when the delay flag is at the second logical value, passing, via the packet management program, the another data packet to said one of the others of the application programs based on the priority with which the application program that is to receive the another data packet is assigned.

6. The method as claimed in claim 4, wherein the specific one of the application programs corresponds to one of the application programs that is presented in the foreground window.

* * * * *